United States Patent [19]

Hrabal

[11] Patent Number: 4,871,299
[45] Date of Patent: Oct. 3, 1989

[54] SCREW COMPRESSOR UNIT INCLUDING A CENTRIFUGAL CLUTCH

[75] Inventor: Hans Hrabal, Vienna, Austria

[73] Assignee: Hoerbiger Ventilwerke Aktiengesellschaft, Braunhubergasse, Vienna, Austria

[21] Appl. No.: 152,400

[22] Filed: Feb. 4, 1988

[30] Foreign Application Priority Data

Feb. 5, 1987 [AT] Austria .................................. 237/87

[51] Int. Cl.$^4$ ............................................. F04B 35/00
[52] U.S. Cl. ..................................... 417/319; 418/69; 192/105.B
[58] Field of Search .................. 417/319, 223; 418/69; 192/105 B, 113 A, 103 A

[56] References Cited

U.S. PATENT DOCUMENTS

| | | | |
|---|---|---|---|
| 1,720,766 | 7/1929 | Spahr | 192/105 B |
| 1,850,226 | 3/1932 | Dickson | 192/105 B |
| 2,459,709 | 1/1949 | Lysholm | 417/223 X |
| 3,002,597 | 10/1961 | Warman, Jr. et al. | 192/113 A |
| 3,171,524 | 3/1965 | Croft et al. | 192/105 B |
| 3,762,519 | 10/1973 | Bentley | 192/105 B X |
| 3,953,787 | 4/1976 | Helbling | 60/327 X |
| 4,561,827 | 12/1985 | Beaumont | 417/319 X |
| 4,643,282 | 2/1987 | Edl | 192/113 A X |

FOREIGN PATENT DOCUMENTS 162191 1/1949 Austria .
2019493 10/1979 United Kingdom ................ 417/319

Primary Examiner—Carlton R. Croyle
Assistant Examiner—Leonard P. Walnoha
Attorney, Agent, or Firm—Watson, Cole, Grindle & Watson

[57] ABSTRACT

The compressor unit consists of a screw compressor (2) and a drive motor (1), which is connected for drive purposes to the screw compressor (2) by way of an engageable and disengageable clutch (3) and can be temporarily stopped in order to control the throughput of the screw compressor (2). To allow starting of the compressor unit without the drive motor (1) becoming thermally overloaded, the clutch inserted between the drive motor (1) and screw compressor (2) is in the form of a known centrifugal clutch (3), the driving clutch member (17) being connectable to the driven clutch member (18) by means of friction plates (23, 28). For automatic operation of the centrifugal clutch (3), a control chamber (21) is provided, the presser plate (36) of which is adjustable against the friction plates (23, 28) by means of centrifugal weights (34). The presser plate (36) can be provided with return springs (40) and one of the friction plates (23) of the driving clutch member (17) can be pressed against the presser plate (36) of the control chamber (21) by one or more annular springs (41). Ventilation bores (45) and ventilation slots (46) are provided in the friction plates (23).

6 Claims, 2 Drawing Sheets

SCREW COMPRESSOR UNIT INCLUDING A CENTRIFUGAL CLUTCH

BACKGROUND OF THE INVENTION

The invention relates to a compressor unit comprising a screw compressor or the like, and a drive motor which is connected for drive purposes to the compressor by way of an engageable and disengageable clutch and can be temporarily stopped in order to control the screw compressor throughput (intermittent control), during which the drive connection to the screw compressor is interrupted by the clutch.

In compressing air or other gases it is a known requirement to be able within a given operating time to vary the throughput of the compressor unit which performs the work of compression so that it corresponds to the actual compressed medium requirement. In the case of reciprocating compressors, various continuous adjustment methods are known, these mostly adapting the compressor throughput to the actual requirement to an exact degree by adjusting the working valves. In the case of screw compressors which have no control equipment comparable to the reciprocating compressor working valves, the throughput adjustment is done either by throttling the suction line or by temporarily stopping the compressor by switching off the drive motor (intermittent control). Control by throttling the suction line results in energy loss because the compressor and drive motor carry on running when there is no delivery. Disengaging the compressor also results in losses if the prime mover is not stopped at the same time.

Control methods for screw compressors are also known in which the drive motor is stopped together with the screw compressor as soon as the required pressure is reached in the distribution system supplied by the compressor or in a pressure vessel. In this case, however, there are problems in the restarting of the compressor unit when further delivery is required for supplying the system. This is because in the case of screw compressors when under stoppage there is no particular load torque active as such compressors are of the so-called internally non-tight type, in which the load torque is dependent on the speed of rotation. Nevertheless, the load torque rises rapidly with increasing speed of rotation, particularly if the screw compressor is to run against the full compression pressure, so that danger of thermal overloading of the drive motor exist, and in any event there is a comparatively long run-up time. With this control method, prompt resumption of delivery is not ensured. This drawback can only be mitigated by costly technology. Additional suction throttle control is therefore generally provided, with provision for pressure unloading of the screw compressor at standstill, so that a pressureless start is possible. This equipment and these provisions, to which the necessary controls must be added, result in considerable additional expense.

A further difficulty in the intermittent control of compressor units derives from the fact that the drive motors during startup consume a higher current than when they have attained their rated speed and full torque. Even when a screw compressor is started with pressure unloading, it can happen that if short operational pauses follow one after the other, i.e. during frequent starting within a given time period, the drive motor becomes thermally overloaded. Motor manufacturers therefore frequently prescribe how many starts per unit of time are allowed as a maximum, and this figure should not be exceeded.

If a clutch is used between the drive motor and screw compressor, costly control equipment for the engagement and disengagement of the clutch is required. On starting the compressor unit it must be checked that the clutch is disengaged, and on reaching a given speed of rotation the clutch must be engaged. On stopping the unit the clutch must be disengaged at the correct time. If the control equipment fails or operates inaccurately, e.g., because of incorrect setting, there is again danger of thermal overloading of the drive motor.

SUMMARY OF THE INVENTION

The object of the invention is to improve previously known compressor units comprising screw compressors so that they can undergo frequent stoppages per unit of time and be again started without the drive motor suffering thermal overload and without costly switching and control equipment being required for this purpose.

This object is attained according to the invention in that the clutch inserted between the drive motor and screw compressor is a centrifugal clutch comprising a driving clutch member and a driven clutch member, between the two clutch members there being disposed discs side by side in the form of friction plates and of which the inner discs are connected to the driving clutch member such that they rotate therewith but are axially displaceable thereto, and the outer discs disposed alternate to the inner discs are connected to the driven clutch member such that they rotate therewith but are axially displaceable thereto, there being provided a control chamber comprising a presser plate which is displaceable towards the friction plates and can be adjusted against the friction plates by means of centrifugal weights in the control chamber.

Centrifugal clutches are already known in various forms, for example from AT-PS 162 191. These clutches are used in order to effect delayed coupling in the driving of rotary machine parts. The reason for using centrifugal clutches is generally to overcome a comparatively large starting torque of the driven machine. As the friction plates then slide on each other for a comparatively long time they undergo considerable wear, so that the life of centrifugal clutches is limited to a given number of engagement sequences. Because of this, although they have been known for a long time, centrifugal clutches have not yet been used for driving and controlling compressors, particularly screw compressors. Surprisingly, it has now been found that in controlling the throughput of screw compressors and other similar compressors of the internally non-tight type, for which the full load torque does not have to be immediately overcome when starting from rest, centrifugal clutches can be used with particular advantage. Precise constructional formation of the centrifugal clutch taking into account its specific properties can produce a simple overall arrangement of the compressor unit which can be controlled by stoppage as often as required in practice.

In the compressor unit according to the invention the centrifugal clutch effects automatic coupling and decoupling of the screw compressor to or from the drive motor according to the speed of rotation, without any additional technical input. Thus, neither pressure unloading of the screw compressor, nor throttling of the suction line nor any other intervention on the compressor is necessary. During starting, the screw compressor is only coupled to the drive motor when this is at least close to its rated speed of rotation, and has thus attained a sufficient torque for bringing the screw compressor quickly up to the speed required for delivery, even against the full pressure of the medium. As this starting process proceeds quickly and the centrifugal clutch is slipping only for a short time, the wear on the clutch is small so that the clutch life is sufficiently long. On disengaging the drive motor the screw compressor is equally quickly decoupled and stops, while the drive motor runs down. As the compressor unit according to the invention starts rapidly without any large load torque to be overcome at low speed, frequent stoppages per unit of time are possible without any thermal overloading of the drive motor. Thus, overall, the invention provides a technically simple and automatically operating facility for controlling the throughput of screw compressors to match the actual requirement, and which at the same time is economical because of lack of energy losses.

In a further embodiment of the invention the presser plate of the centrifugal clutch can be provided with return springs which act in the direction away from the friction plates. These return springs not only prevent the presser plate from pressing the various friction plates together too early during starting and so causing unnecessary wear, but also ensure rapid disengagement of the centrifugal clutch during stoppage of the drive motor, so that the screw compressor which remains under the pressure of the medium can stop comparatively abruptly while the drive motor runs down. Thus the return springs increase the life of the friction plates.

In a further improvement of the centrifugal clutch used in the invention, the presser plate is adjacent to an inner disc which is connected to the driving clutch member, and which is pressed against the presser plate by at least one annular spring disposed coaxial to the friction plates. The annular spring ensures a proper frictionally resistant connection between the driving clutch member and the presser plate of the control chamber, even if the clutch is still at rest. This is therefore an acceleration aid for the control chamber, by which the control time for the centrifugal clutch is shortened and thus the life of the friction plates lengthened, because the friction plates rub against each other for a shorter period corresponding to the shorter control time.

The annular spring is appropriately supported on a snap ring fixed into an annular groove in the driving clutch member. This results not only in simple construction but it also prevents the annular spring unfavourably affecting other friction plates. In order to prevent overloading the annular spring and to provide for easy adjustment of the required spring force, the annular spring preferably consists of a spring pack made up of arched spring rings. Any arched spring rings can be used such as undulated rings or annular springs arched into a cylindrical surface. Cup-shaped springs could also be considered. Flat intermediate rings can be positioned between the undulated or otherwise arched springs.

According to a further improvement of the invention, the inner discs are provided with axial through ventilation slots, from which radial ventilation bores lead outwards. These ventilation bores, which extend preferably radially in the discs, are traversed by air to thus cool the discs, so that even with frequent stoppage of the compressor unit any thermal overloading of the centrifugal clutch is prevented. It might also be possible to forcibly circulate a different cooling medium than air through the ventilation slots and ventilation bores.

According to a further improvement of the invention, the ventilation slots in the inner discs can be connected to ventilation channels provided in the driven clutch member, and which open into the atmosphere at a smaller radial distance from the axis of rotation of the centrifugal clutch than the radial ventilation bores in the inner discs. By this means a forced air flow is produced through the ventilation bores as in the case of a radial blower. On rotation of the clutch, the air flows radially outwards through the ventilation bores because of centrifugal force, so that fresh air is sucked through the ventilation channels. By this means automatic cooling is produced without any particular expense.

DETAILED DESCRIPTION OF THE PREFERRED EMBODIMENT

Figure 1:
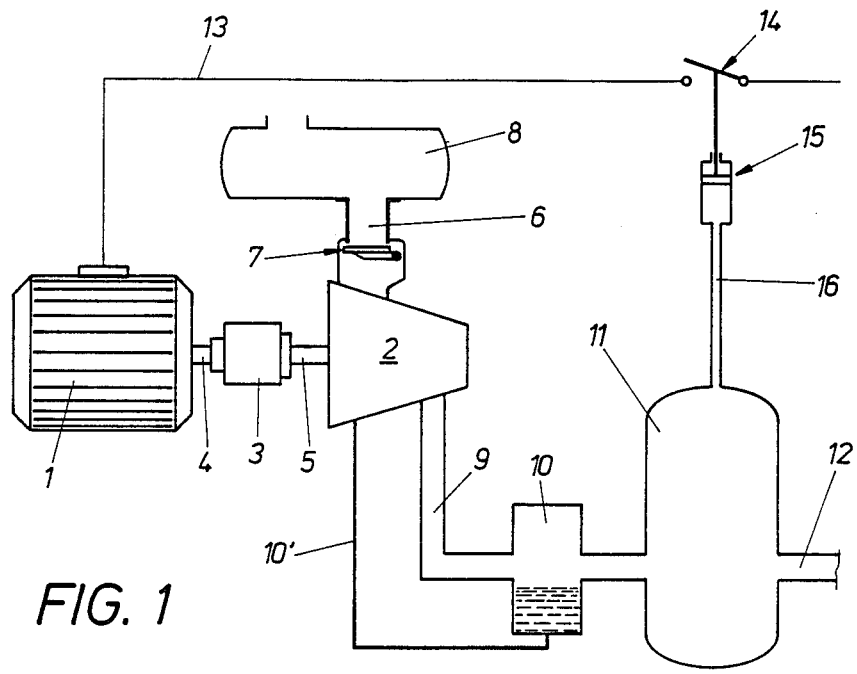
FIG. 1 is a diagrammatic illustration of a compression plant incorporating the compressor unit according to the invention.

As shown in FIG. 1 the compressor unit consists of a drive motor 1 and a screw compressor 2, which are connected together for drive purposes by a centrifugal clutch 3. The centrifugal clutch 3 is inserted between a drive shaft 4 of the drive motor 1 and a driven shaft 5 leading to the screw compressor 2. Instead of this coaxial shaft connection, a belt drive preferably with V belts can be provided. The drive pulley can be incorporated in the centrifugal clutch. The screw compressor 2 is provided with a suction line 6 in which a non-return valve 7 in the form of a flap and an air filter 8 are incorporated. From the screw compressor 2 a pressure line incorporating an oil separator 10 leads to a pressure vessel 11. From this there extends a user line 12. Current feed to the drive motor 1 is by way of an electrical switch 14 operated by a pressure switch 15 which is connected to the pressure vessel 11 by a control line 16.

Figure 2:
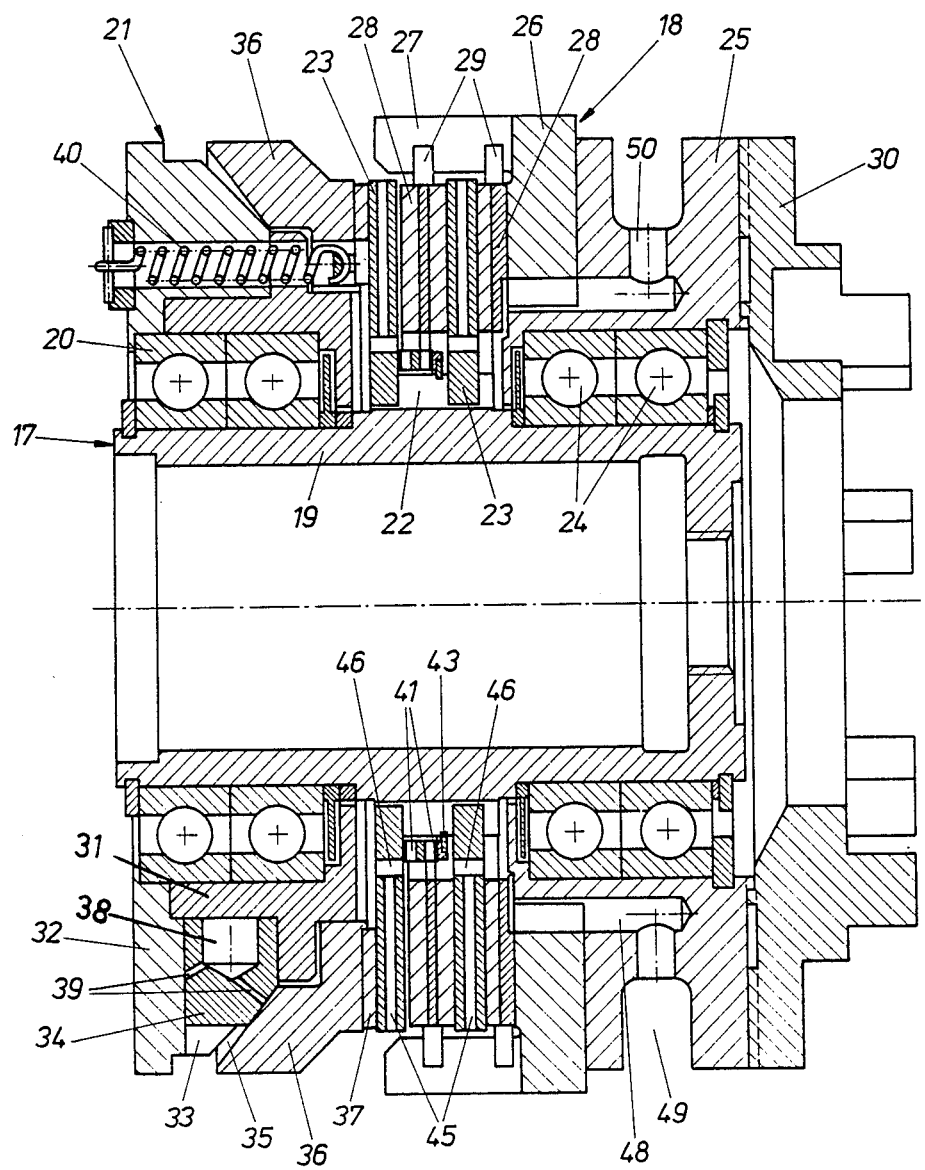
FIG. 2 is an axial middle section through the centrifugal clutch used.

The construction of the centrifugal clutch 2 can be seen from FIG. 2. It consists of a driving clutch member 17 and a driven clutch member 18. The driving clutch member 17 is in the form of a hollow shaft 19 which sits on the drive shaft 4 of the motor 2 and on which a control chamber 21 is supported in a freely rotatable manner by two ball bearings 20 mounted side by side. In its central portion the hollow shaft 19 is provided with radially projecting gear-type longitudinal ribs 22 on which friction plates in the form of inner discs 23 are mounted so that they rotate therewith but can slide axially thereto.

The driven clutch member 18 is likewise rotatably supported on the hollow shaft 19 of the driving clutch member 17 by ball bearings 24. It consists of a hub 25 which sits directly on the ball bearings 24 and on which there is fixed a support ring 26 which at its outer circumference projects over the friction plates by means of axial ribs 27. By means of toothing 29 provided on their outer edge, friction plates in the form of outer discs 28 engage in the axial ribs 27 in such a manner that they rotate with these latter but can slide axially thereto. On the other side of the hub 25 there is fixed a fastening plate 30 which is used to make the connection to the driven shaft 5 leading to the screw compressor 2.

The control chamber 21 sits by way of a hub ring 31 on the two ball bearings 20. A retention ring 32 is fixed to the hub ring 31 and is provided with radial outwardly open chambers 33 which are distributed over its circumference and in which centrifugal weights 34 are supported in a radially displaceable manner. The centrifugal weights 34 rest against an inclined surface 35 of a presser plate 36 which lies against an inner disc 23 by way of a friction lining 37. The centrifugal weights 34 have an inwardly open hollow space 38 in which lubricant such as grease is contained and which as the control chamber 21 rotates is fed by centrifugal force through small bores 39 and onto the inclined surface 35 of the presser plate 36 and inner surface of the retention ring 32. In the retention ring 32 there are also fixed return springs 40 which act on the presser plate 36 and urge this in the direction away from the friction plates 23, 28. The tension springs 40 also urge the inclined surface 35 of the presser plate 36 against the centrifugal weights 34 to thus act against the centrifugal force generated by the centrifugal weights 34 when the control chamber 21 rotates.

Figure 3:
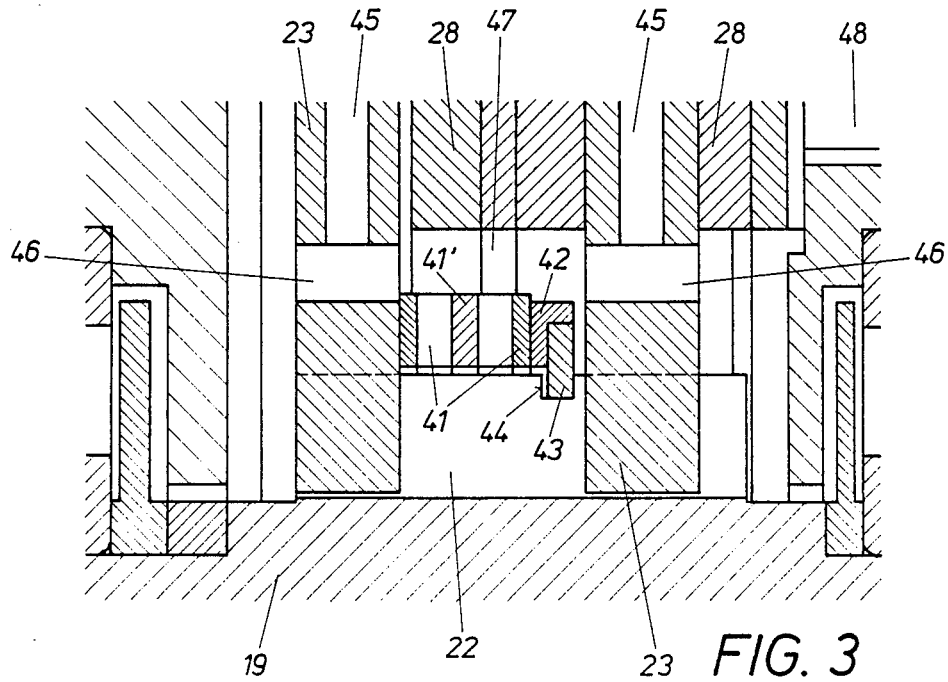
FIG. 3 is an enlarged detail of the centrifugal clutch of FIG. 2.

The inner disc 23 adjacent to the presser plate 36 is urged against the presser plate 36 by annular springs 41. The inner disc 23 is thus permanently pressed against the friction lining 37 of the presser plate 36. The annular springs 41 are disposed coaxial to the hollow shaft 19 of the driving clutch member 17 on the longitudinal ribs 22 of the hollow shaft 19. As can be seen from FIG. 3, on that side which faces away from the inner disc 23 the annular springs 41 rest against a support ring 42 retained by a spring ring 43 which engages in an annular groove 44 in the longitudinal ribs 22. In the illustrated embodiment, two undulated arched annular springs 41 are provided with an intermediate ring 41' disposed therebetween. Other annular springs can however be used in any desired number, and a spiral spring could also be considered for this purpose.

In order to prevent overheating of the friction plates, the inner discs 23 are provided with radially disposed outwardly extending ventilation bores 45. The ventilation bores 45 extend from ventilation slots 46 in the shape of a annular arc which pass through the inner discs 23 close to their inner edge. The ventilation slots 46 are connected together by way of the hollow space 47 between the outer edge of the annular springs 41 and the inner edge of the outer discs 28, and also to ventilation channels 48 which as shown in FIG. 2 open into an outwardly open peripheral groove 49 in the hub 25 of the driven clutch member 18. The mouth openings 50 lie on a smaller pitch circle diameter than the outlet openings of the ventilation bores 45 in the inner discs 23. The mouth openings 50 therefore act as suction openings for the cooling air.

In the embodiment of FIG. 1 the electrical switch 14 is shown open, the drive motor 1 therefore being unpowered and the compressor unit at standstill. As soon as the switch 14 is closed, the drive motor 1 starts. The centrifugal clutch 3, the centrifugal weights 34 of which are in the position shown in FIG. 2, is initially disengaged during this. The driving clutch member 17 rotates together with the drive motor and also rotates the inner discs 23. These are however not engaged with the outer discs 28, and thus the driven clutch member 18 remains initially at rest, as does the screw compressor 2. The rotating hollow shaft 19 exerts an entrainment force on the control chamber 21 by virtue of the friction force through the ball bearings 20. This bearing friction is however comparatively small. In addition to this the annular springs 41 press that inner disc 23 adjacent to the control chamber 21 against the friction lining 37 of the presser plate 36. By this means the control chamber 21 is put into rotation comparatively rapidly. The centrifugal force acting on the centrifugal weights 34 then becomes progressively greater until the return force of the return springs 40 is overcome. As soon as this happens the centrifugal weights 34 move outwards and slide the presser plate 36 against the driven clutch member 18, by which the friction plates made up of inner discs 23 and outer discs 28 are pressed firmly together. The centrifugal clutch is thus comparatively rapidly engaged without the friction plates sliding against each other for a lengthy period.

When the centrifugal clutch 3 engages, the rotor of the screw compressor 2 is rotated by means of the driven shaft 5. As the screw compressor belongs to that class of compressors which are internally non-tight, the rotor of the screw compressor 2 can be moved out of its rest state comparatively easily and with only a small torque. The load torque rises quickly with increasing rotor speed. The centrifugal clutch 3 does not engage until the drive motor 1 has at least nearly or better still fully reached its rated speed and has thus attained a sufficiently large torque to quickly accelerate the rotor of the screw compressor 2 and to bring it up to its rated speed, even if the medium is at full pressure. The non-return valve 7 in the suction line 6 has already opened during starting, so that the medium is drawn through the filter 8. The medium is firstly fed through the pressure line 9 and into the oil separator 10, from which any separated lubricant is returned through a line 10' to the screw compressor 2 for lubricating this latter. The compressed air or gas then reaches the pressure vessel 11 in which pressure is built up depending on the draw-off through the user line 12.

As soon as a preset maximum pressure is reached in the pressure vessel 11, the pressure switch 15 acts and moves the electrical switch 14 again into the open position shown in FIG. 1. The drive motor 1 thus loses its drive torque and initially slows down rapidly together with the screw compressor 2. On falling below a given rotation speed the centrifugal weights 34 are moved back under the action of the return springs 40 into the position shown in FIG. 2, with simultaneous pulling of the presser plate 36 away from the friction plates 23, 28. The drive connection between the drive motor 1 and the screw compressor 2 is thus abruptly broken, the screw compressor 2 rapidly stops, by which the non-return valve 7 closes, and the drive motor 1 runs down. As soon as the pressure in the pressure vessel 11 falls below a given value fixed at will, the electrical switch 14 is again closed and a new working cycle commences.

The centrifugal clutch 3 connected between the drive motor 1 and screw compressor 2 enables the compressor unit to start against the full supply pressure in the vessel 11. Thus it is not necessary to pressure-unload the screw compressor 2 before starting. Other control provisions are also not required either for the screw compressor 2 or for the centrifugal clutch 3, which engages and disengages at the correct time fully automatically. As the drive motor 1 is subjected to the drive torque of the screw compressor 2 only after it has fully started, its torque is sufficiently large, so that the centrifugal clutch 3 prevents thermal overloading of the drive motor 1.

The compression plant can therefore be repeatedly started and stopped at frequent intervals without the drive motor 1 suffering damage.

As both engagement and disengagement are rapid by virtue of the specific construction of the described centrifugal clutch, the friction plates 23, 28 are loaded for only a short time, so that the centrifugal clutch 3 undergoes only slight wear. This short slippage time of the clutch and the comparatively large accelerating torque are in particular the result of the annular springs 41, which press the inner disc 23 against the presser plate 36 by way of the friction lining 37, so that the control chamber 21 is quickly entrained on starting the drive motor 1 and is put into rotation. The return springs 40 assist this action. The cooling system provided for the inner discs 23 results in continuous air circulation. The air flows radially outwards from the ventilation bores 25 of the inner discs 23 on account of centrifugal force, and is drawn in from the peripheral groove 49 by way of the ventilation slots 46, the hollow space 47 and the ventilation channels 48. In this manner excess thermal loading of the centrifugal clutch 3 is prevented.

What is claimed is:

1. A compressor unit which comprises a drive motor having a drive shaft, a screw compressor having a driven shaft, and a centrifugal clutch which is connected between said drive shaft and said driven shaft and which can engage said driven shaft with said drive shaft or disengage said driven shaft from said drive shaft based on a speed of rotation of said drive shaft, said centrifugal clutch comprising
   an enlongated driving clutch member which is connected to said drive shaft,
   a driven clutch member which is rotatably mounted on said elongated driving clutch member and is connected to said driven shaft,
   a plurality of inner and outer friction discs which are positioned together around said elongated driving clutch member and which are axially movable relative thereto and to one another, said inner friction discs being rotatable with said driving clutch member and said outer friction discs being rotatable with said driven clutch member,
   a control member mounted on said elongated driving clutch member by ball bearing means so as to be freely rotatable with respect to said elongated driving clutch member and operable to engage or disengage said inner and outer friction discs and thereby determine whether said drive and driven shafts are engaged or disengaged; said control member including a retention ring, an axially movable pressure plate, a plurality of return springs connected between said retention ring and said pressure plate to bias said pressure plate towards said retention ring, thereby enabling said inner and outer friction plates to be disengaged, and a plurality of weights positioned between said retention ring and said pressure plate which, when forced radially outwardly due to rotation of said control member by said elongated driving clutch member, will move said pressure plate against the bias of said return springs and away from said retention plate, thereby causing said inner and outer friction plates to become engaged.

2. A compressor unit according to claim 1, wherein said pressure plate is axially movable against an inner friction disc, and wherein a spring means is mounted around said elongated driving clutch and within said plurality of outer discs to bias said inner friction disc against said pressure plate.

3. A compressor unit according to claim 1, wherein said elongated driving clutch member includes radially projecting longitudinal ribs having annular grooves, a support ring positioned around said longitudinal ribs, said support ring being supported by a spring ring which extends into the annular grooves, and wherein said spring means is supported by said support ring.

4. A compressor unit according to claim 3, wherein said spring means comprises a plurality of arched spring discs.

5. A compressor unit according to claim 4, wherein inner friction discs include axial ventilation slots and radial ventilation bores therein.

6. A compressor unit according to claim 5, wherein said driven clutch member includes an axial ventilation channel and a radial ventilation groove, said axial ventilation channel communicating with said axial ventilation slots of said inner friction discs.

* * * * *